United States Patent

Lemaire

[11] 4,204,793
[45] May 27, 1980

[54] DEVICE FOR HANDLING CONTAINERS

[76] Inventor: Pierre H. Lemaire, 5, Ave. des Frenes, Vaux-le-Penil, 77000 Melun, Paris, France

[21] Appl. No.: 905,746

[22] Filed: May 15, 1978

[30] Foreign Application Priority Data

May 16, 1978 [FR] France .................. 77 14844

[51] Int. Cl.² .............................................. B60P 1/48
[52] U.S. Cl. ................................... 414/421; 414/491; 414/498; 414/546
[58] Field of Search .............. 414/469, 498, 546, 421, 414/491; 298/22 R

[56] References Cited

U.S. PATENT DOCUMENTS

| 3,825,137 | 7/1974 | Mackrill et al. | 414/498 |
| 3,892,323 | 7/1975 | Corompt | 414/498 X |
| 4,111,485 | 9/1978 | Martin et al. | 298/22 R X |
| 4,147,266 | 4/1979 | Corompt | 414/498 X |

Primary Examiner—Robert G. Sheridan
Attorney, Agent, or Firm—Burgess, Ryan and Wayne

[57] ABSTRACT

A vehicle-mounted container handling device which is capable of mounting and dismounting containers from the vehicle, and tilting a container mounted on the vehicle for dumping purposes. A tipping chassis pivotally mounted to the rear of the vehicle frame supports a transverse coupling shaft, upon which an articulated gantry is pivotally mounted. The gantry has an upper arm with a prehension device at its free end for grasping a container, and a lower arm comprising upper and lower booms hinged together. The upper boom is arranged to rest on and be supported by the lower boom, and a hydraulic jack extends between the rear of the vehicle frame and the upper boom to provide bi-directional movement of the gantry.

11 Claims, 5 Drawing Figures

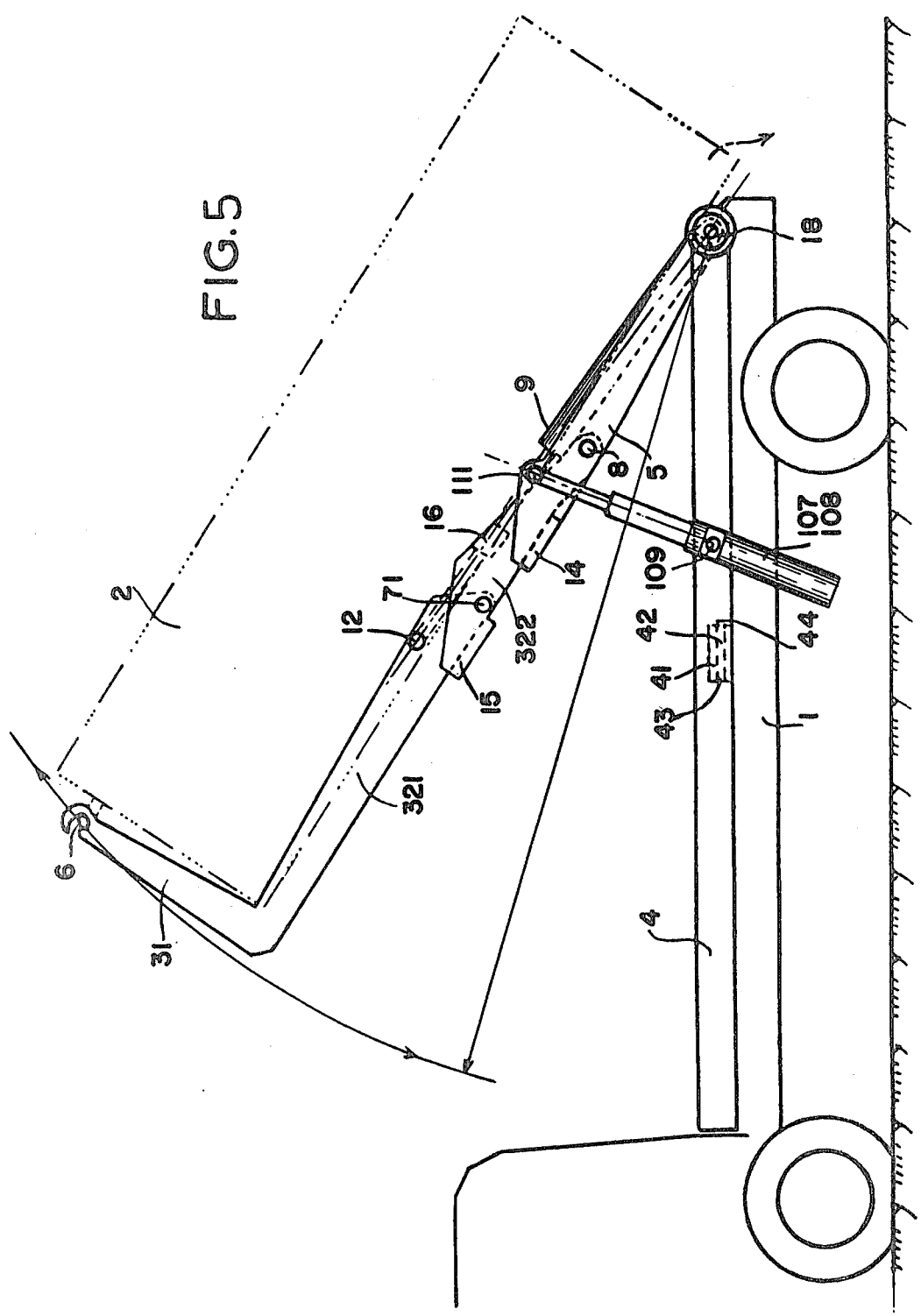

DEVICE FOR HANDLING CONTAINERS

This invention concerns a device installed on a vehicle designed for transportation and handling of containers.

More exactly, the device enables loading of a container onto the vehicle from the ground, carrying out of the reverse operation, and tilting the container, when installed on a vehicle, in order to empty the contents. During these operations, the device is connected to the container by a hooking system located on the front panel of the container.

Already known devices of this type, due to their high dead weight, greatly reduce the working load of vehicles equipped with them and the purpose of this invention is to give a handling device for which, for equal performances, the dead weight is much lower.

The dead weight of known devices, comes from the design itself of the apparatus.

In fact, on all of these devices, the same hydraulic jack is used both for the "container loading and unloading" as for the "container tipping" function. As a result, the maximum values of the lever arm used for each of these functions and in accordance with which the jack is actuated, are obtained at the cost of the compromise between often contradicting requirements. The result is that the maximum values obtained are not optimum values. In fact, it can be seen that the loads on the superstructures and infrastructures of these devices are considerable and that, as a result, the manufacturers are obliged to use a heavy and expensive construction.

On the other hand, on the device described in this invention, each function is carried out independently of the other so that, to carry out any function, it is possible to find the optimum lever length without having the problem of the required result jeopardising the value already selected for the lever arm corresponding to another function. Thus, the lever arm values obtained are optimum for each function, the loads are lower and construction is lighter. Therefore, added to the fact that the hydraulic jacks on this device, opposite to the others, are only subject to heavy loads in extension, it is possible to use smaller jacks, therefore lighter ones, and in addition, this gives a reduction in the number of jacks appropriated to each of these functions.

Briefly, the subject of this invention is to produce a vehicle-mounted container handling device which succeeds in giving a priori difficultly reconciliable qualities, namely low dead weight and high performance.

The device, which is the subject of this invention, rests on a framework attached to the chassis of the vehicle and has a handling gantry hinged on a transverse coupling shaft supported by a tipper chassis, which, in its turn, is hinged at its rear end to the rear end of the vehicle on the frame; the gantry consists of two arms forming a bracket; the upper arm has the prehension device at its free end and the lower arm consists of two booms hinged together, the upper boom and the lower boom; the device has a system enabling the upper boom to rest on the lower boom and at least one hydraulic jack for manipulation of the gantry.

Due to the design of the invention, this jack is hinged at the front end on the upper boom of the lower arm of the gantry and by its rear end around the horizontal transverse shaft located at the rear end of the vehicle on the frame, and around which the tipper chassis rotates on its rear end. Due to another design of the invention, this jack is hinged at its front end on the upper boom of the lower arm of the gantry, and at its rear end on a shaft which is attached to the tipper chassis, located between the gantry tipping shaft of the tipper chassis and the hinge of the latter to the frame attached to the vehicle.

The device in this invention is fitted with a means to enable emptying of the container contents, for pivoting the tipper chassis around the transverse horizontal shaft located at the end of the vehicle. Due to the design of the invention, this means is fitted with at least one two-way hydraulic jack, the front end of which is hinged around the framework fixed to the vehicle, and the rear end of which is hinged on the tipper chassis.

Due to the particular design of this means, the hydraulic jack is a single-way telescopic type. But in this case, a system is provided to lock the tipper chassis to the frame, the latter fitted with a vehicle cross member attachment device, so that, at least during the beginning of the phase of lifting the container from the floor, the assembly consisting of the gantry and the tipper chassis, cannot pivot under the load around the horizontal transverse shaft located at the rear end of the vehicle.

In addition, the tipper chassis has a system for moving the gantry assembly around the transverse shaft, located at the rear of the vehicle, which in turn brings the container into the tilted position, thus emptying its contents.

Due to the invention design, this system also has two side sills which are part of the tipper chassis, connected by a transverse beam on which the lower boom structure rests freely and, also an extension towards the front of the lower boom system beyond its hinging point to the upper system, thus enabling the latter to be supported by the lower boom system.

Due to the design of the invention, the system uses two side sills, which are part of the tipper chassis, connected by a transverse beam on which the upper and lower booms may rest at the same time, so that the gantry assembly may rest on the upper chassis.

Due to a special feature of the invention, the geometrical axis of the horizontal shaft, on which the gantry is hinged, is almost transversely perpendicular to the vehicle and should contain the load centre of gravity, once it is correctly positioned on the vehicle for transportation.

As a result of another special feature of the invention, the hinge points of the upper and lower booms of the gantry are located nearer the tipper chassis gantry assembly hinge and the opposite end of this hinge to the lower arm of the gantry.

The appended drawings show, as an example, two ways of installing the device in accordance with this invention.

The first way concerns a device in which the "container tipping" function is ensured by at least one two-way jack, as shown in FIGS. 1, 2 and 3.

Figure 4:
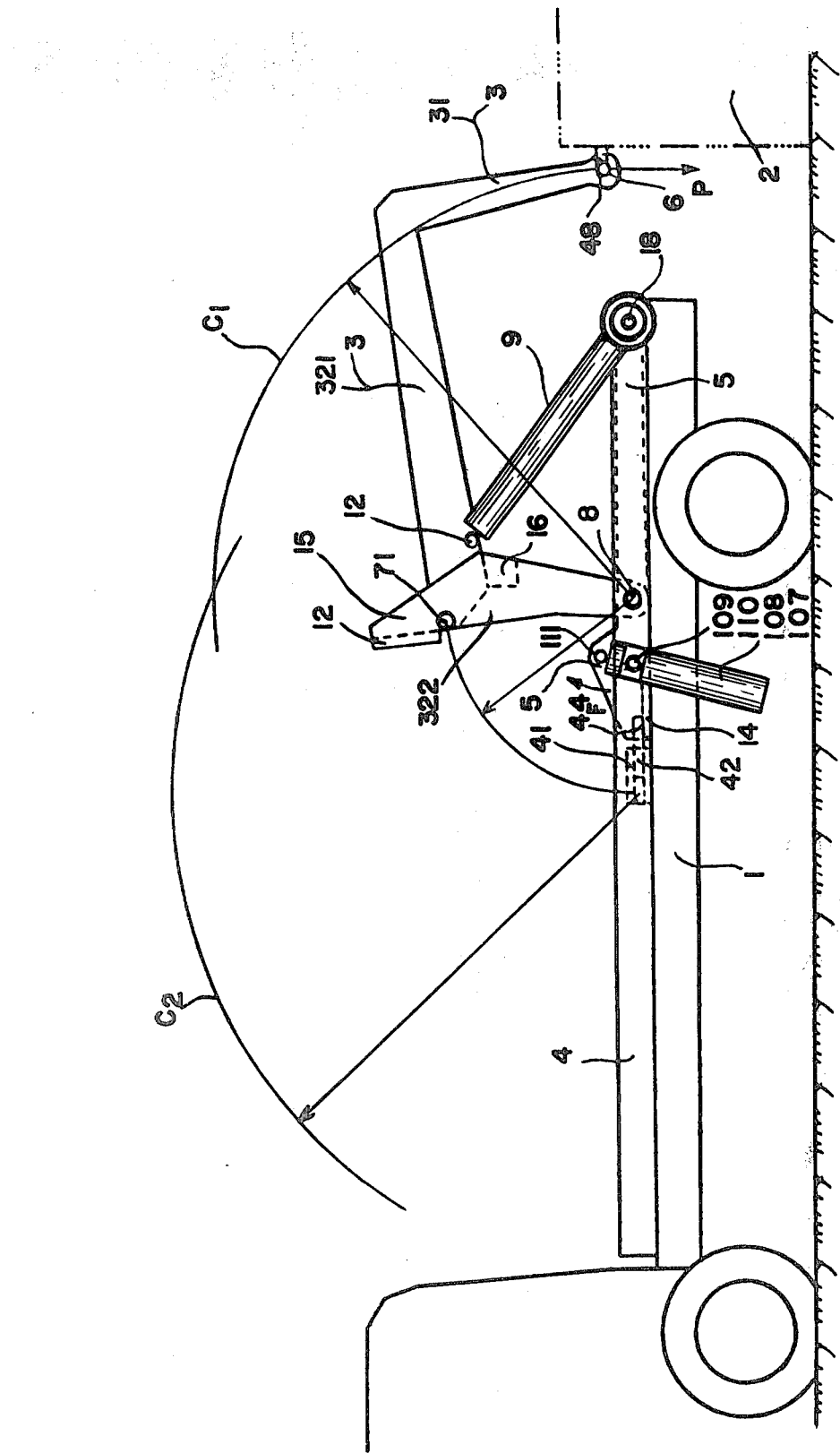

The second installation mode is for a device for which the "container tipping" is carried out by 2-way telescopic jacks, as illustrated in FIGS. 4 and 5.

FIG. 4 is an elevation view showing the container loading or unloading stages.

FIG. 5 shows the device in tipping position, in order to empty the contents from the container.

We shall begin with a description of the first installation mode.

Figure 1:
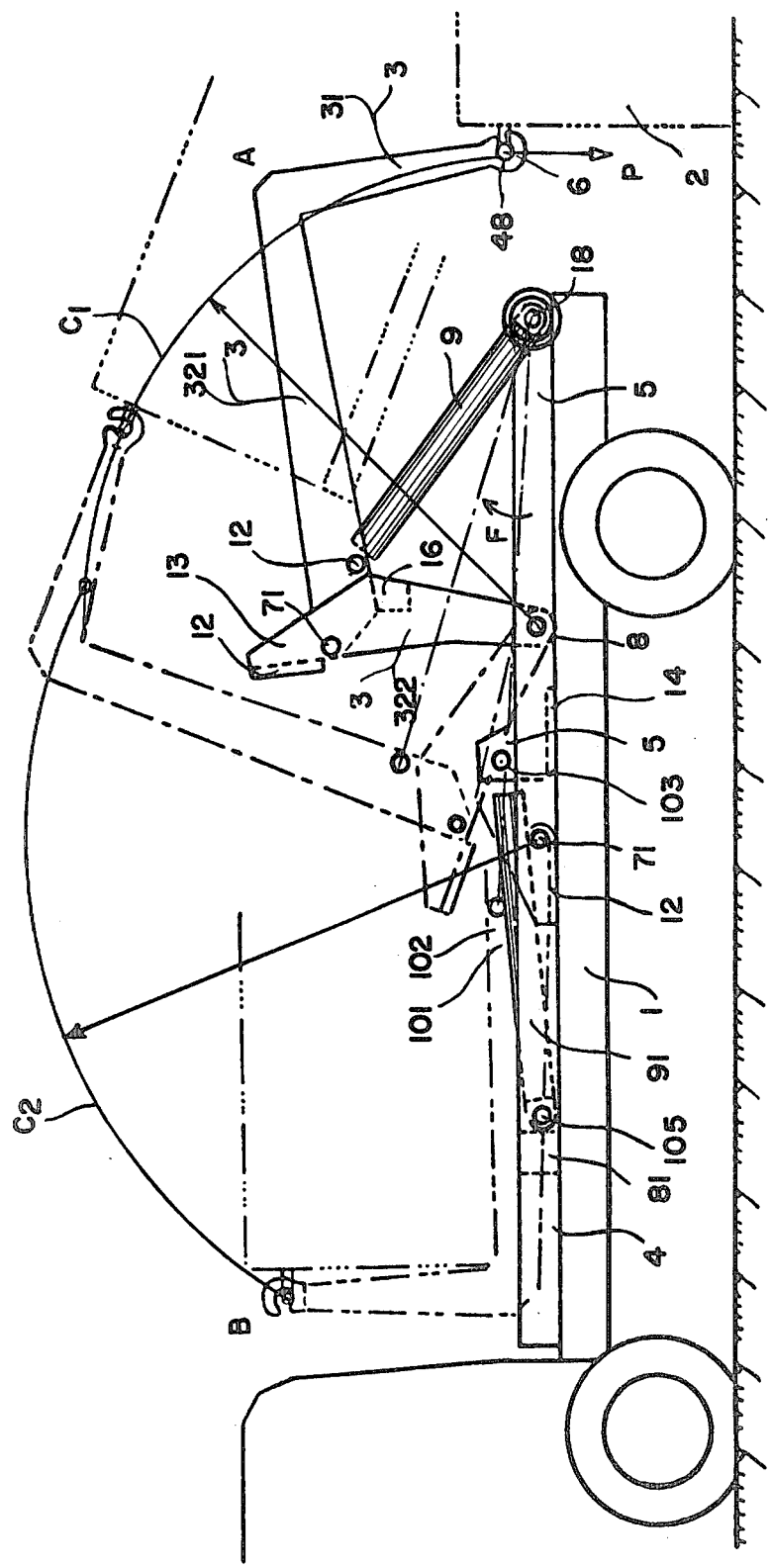
FIG. 1 is an elevation view of a road vehicle fitted with a handling device showing the loading and unloading stages for a truck box.
Figure 2:
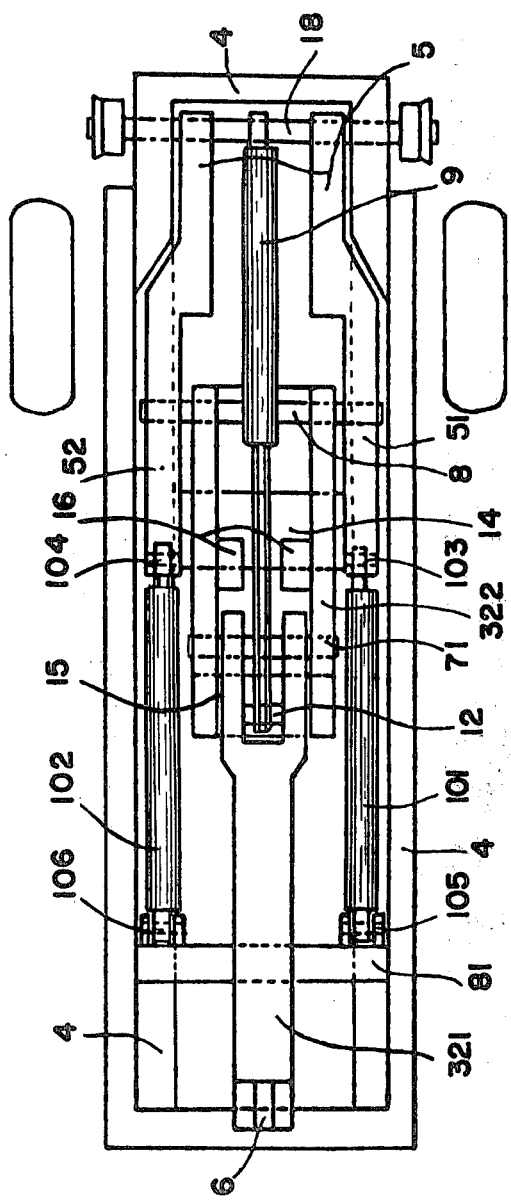
FIG. 2 shows a top view of the device.
Figure 3:
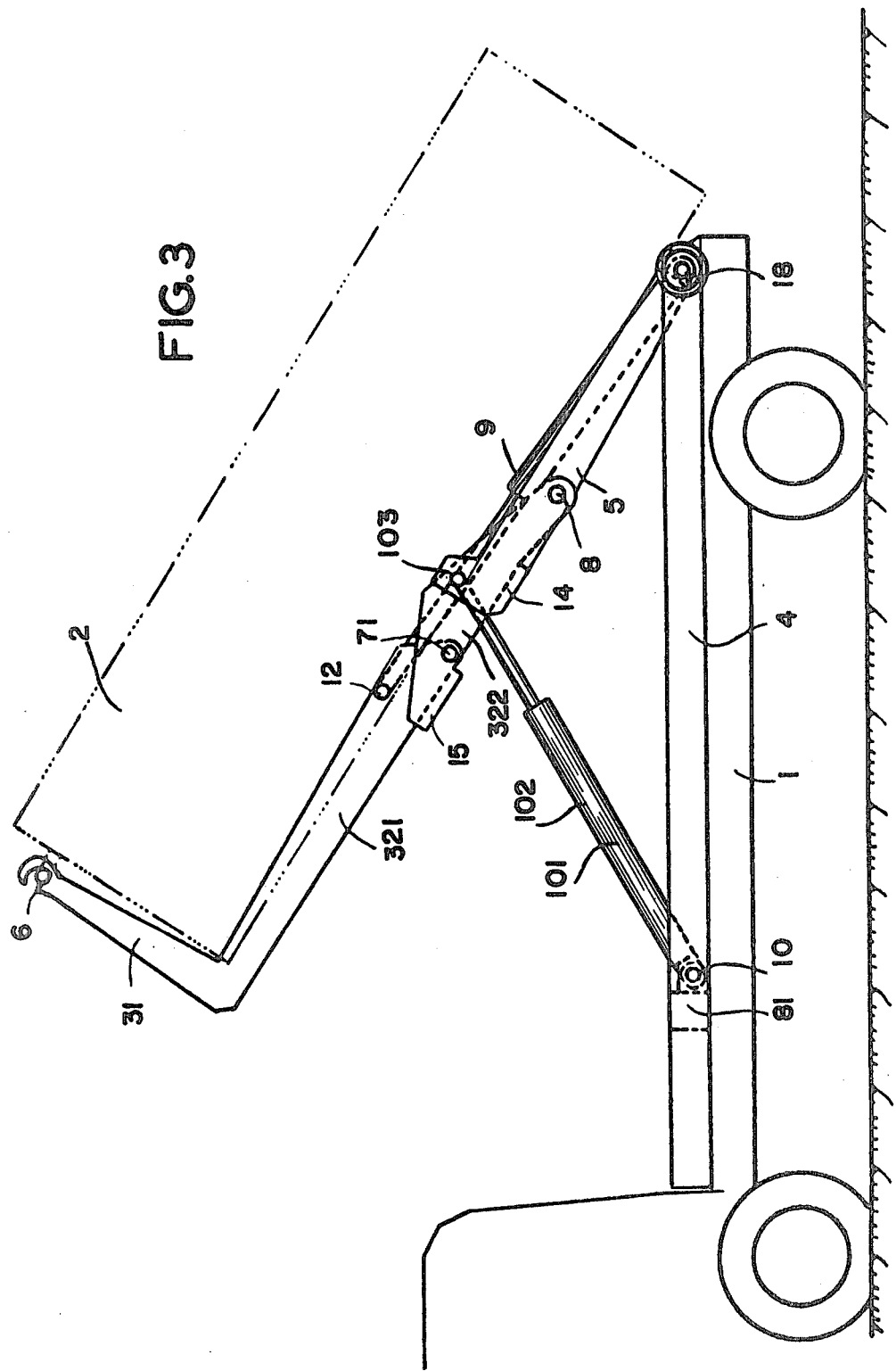
FIG. 3 shows the device in tipper position, in order to empty the contents from the box.

As shown in FIGS. 1 and 2, the device is installed on a road vehicle 1, consisting of a truck. It is fitted with a handling gantry 3, hinged on transverse shaft 8, supported by tipper chassis 5, which in turn is hinged at its rear end on the rear end of the vehicle on shaft 18, supported by the chassis frame 4 attached to vehicle 1. Gantry 3 consists of 2 arms forming a bracket, upper arm 31 fitted at its free end with a prehension system consisting of hook 6 and lower arm 32, consists of 2 booms 321 and 322 hinged to one another along shaft 71. The upper boom 321 may rest on the lower boom 322 by means of stops 16.

Hydraulic jack 9 is hinged at its rear end around transverse shaft 18 and at its front end around shaft 12, supported by upper boom 321.

Two 2-way hydraulic jacks 101 and 102 located either side of the gantry are hinged at their front ends around shafts 105 and 106, supported by transverse beam 81, attached to frame 4, and by their rear ends to shafts 103 and 104, located respectively at the front ends of side sills 51 and 52 of the tipper chassis 5 (FIG. 2).

A transverse beam 14, on which the lower beam 322 may rest, connects side sills 51 and 52 of tipper chassis 5.

Furthermore, the lower boom 322 has a forward extension 15 beyond its hinge point 71, connecting with the upper boom. The upper boom, 321 may rest on the extension 15.

First of all, we will describe the operation for loading the container from the ground, referring to FIG. 1.

With container 2 on the ground, the truck is reversed in order to engage the hooking ring 48 of the container in hook 6. The gantry is then in position A: it can be seen in FIG. 1 that the upper boom rests on the lower boom by means of stops 16 and that, without the existence of these stops, due to the positions of shafts 8 and 71, the load line P passes through the hook and the jack action line passes through 12 and 18, the hinge system consisting of the gantry and the jack would be in an unstable equilibrium.

Then jack 9 is actuated in order to extend its shaft. The gantry assembly then moves container 2 pivoting around shaft 8, making hook 6 describe the arc of circle C1. During this movement, the upper boom 321 rests on the lower boom. This support is maintained until the lower boom 322 itself rests on the tipper chassis 5, by means of the transverse support 14. Jack 9 continues to extend, the upper boom 321 no longer rests on 16 on lower boom 322, and pivots in turn, making hook 6 describe an arc of circle C2 around centre 71, consequently pulling along box 2. When hook 6 reaches position B, the container is in its final loading position on the vehicle.

It will be seen that due to the fact that jacks 101 and 102 are 2-way, the assembly consisting of the gantry and the tipper chassis 5 can pivot in direction F around shaft 18 under load P, see FIG. 1.

For the unloading of the container to the ground, the operation is carried out in reverse.

We will now describe the operation for tipping the container in order to empty the contents. First refer to FIG. 1. The device now has hook 6 in position B, the side jacks 101 and 102 are to be dilated (FIG. 2) so that the upper boom rests on the lower boom and the latter rests on tipper chassis 5, the gantry assembly forming a complete system, tilts with the container pivoting around rear shaft 18.

We will now describe the example for the seocnd installation mode, referring to FIGS. 4 and 5.

The parts described above are identical, except for the systems for tipping the container for emptying the contents. These consist of two telescopic 1-way hydraulic jacks, 107 and 108, located either side of frame 4 of the device. These jacks are hinged between shaft 109 and 110 attached to frame 4 and the shafts 110 and 111 located laterally on the tipper chassis 5. A tipper chassis 5 lock 41 on frame 4 is located on the latter. It consists basically of a rigid bar 42 which slides into a housing 43 in frame 4. This sliding bar has a lower active side 44, which comes into contact with the upper side of the transverse beam 14 attached to tipper chassis 5.

Operation is as follows:

Referring to FIG. 4 showing the beginning of the loading of the container on the truck, it can be seen that by moving rigid bar 42 towards the rear of the vehicle, the unit formed by the gantry and the tipper chassis cannot pivot around the transverse shaft 18 in direction F under the load P. In order to carry out the tipping operation, (see FIG. 4) unlock the tipper chassis 5 by moving the sliding bar 42 forward. Then proceed as in the first example described.

It will be seen that due to the independent construction of the various functions, it has been possible, particularly for the second installation mode, to obtain optimum values for the lever arms actuating the jacks.

It will also be seen that during the most difficult handling operations, loading and emptying of the container, the jacks, contrary to existing devices, operate by pushing the load, that is to say in the direction giving them maximum force.

Thus, the device described in this invention, due to the increase in its working load with no correlating increase in dead weight, may be used each time the working load to be transported needs to be increased.

I claim:

1. A device mounted on a frame supported by cross members mounted on a vehicle, for (i) handling a container from the rear of the vehicle with prehension of the container by the front end thereof, (ii) discharging said container from the vehicle, and (iii) inclining the container mounted on the vehicle in order to discharge the contents thereof, said device comprising:

a horizontal transverse rear shaft located at the rear of the vehicle and supported by the frame;

a tipping chassis having a rear end pivotably mounted on said rear shaft;

a horizontal transverse coupling shaft mounted on said tipping chassis forward of and parallel to said rear shaft;

an articulated handling gantry pivotably mounted on said coupling shaft, said gantry comprising pivotably interconnected upper and lower arms forming in one position thereof a rectangular angle bracket, said upper arm having a free end comprising a prehension member, said lower arm comprising an upper boom coupled to and supporting said upper arm, and a lower boom having a first part hinged to and supporting said upper boom, and a second part mounted to said coupling shaft; and at least one hydraulic handling jack for causing said free end of said upper arm to move bi-directionally between the front and rear ends of the vehicle frame, said hydraulic handling jack being pivotably mounted at a front end thereof, to a point located on the upper boom of the gantry lower arm, and at a rear end thereof to said rear shaft.

2. The device according to claim 1, further comprising means for rotating said tipping chassis around said rear shaft.

3. The device according to claim 2, wherein said rotating means includes at least one additional hydraulic handling jack, a front end of said additional jack being pivotably mounted on said frame, and a rear end of said additional jack being pivotably mounted on said tipping chassis.

4. The device according to claim 3, wherein said additional jack has a double acting hydraulic drive means.

5. The device according to claim 3, wherein said additional hydraulic jack has a uni-directional hydraulic mechanism, further comprising means for locking the tipper chassis to the vehicle frame when the free end of the gantry begins moving from an initial position rearward of said rear shaft, toward the front of the vehicle.

6. The device according to claim 5, wherein said locking means comprises a housing attached to the vehicle frame, and at least one rigid bar slidably mounted in said housing and having a lower face for engaging an upper part of the tipping chassis.

7. The device according to claim 5, wherein said additional hydraulic jack is telescopic.

8. The device according to claim 1, wherein said tipper chassis comprises two longitudinal side sills interconnected by a transverse beam, said lower boom resting freely on said beam and having an extension forward of the pivotal mounting point of said front end of said first mentioned hydraulic handling jack on said upper boom, said extension engaging said transverse beam and resting freely thereon.

9. The device according to claim 1, wherein said tipping chassis has two elongated side sills interconnected by a transverse beam, for simultaneously freely supporting the upper and lower booms.

10. The device according to claim 1, wherein the axis of said coupling shaft traverses the center of gravity of the container, when said container is positioned for transportation on said vehicle frame.

11. The device according to claim 1, wherein the point at which the upper and lower booms are hinged to each other is closer to the coupling shaft than the point at which said upper and lower arms are pivotably mounted to each other.

* * * * *